Mar. 27, 1923. E. J. MARTEL 1,449,769
AUTOMOBILE LOCK
Filed July 1, 1921 3 sheets-sheet 1
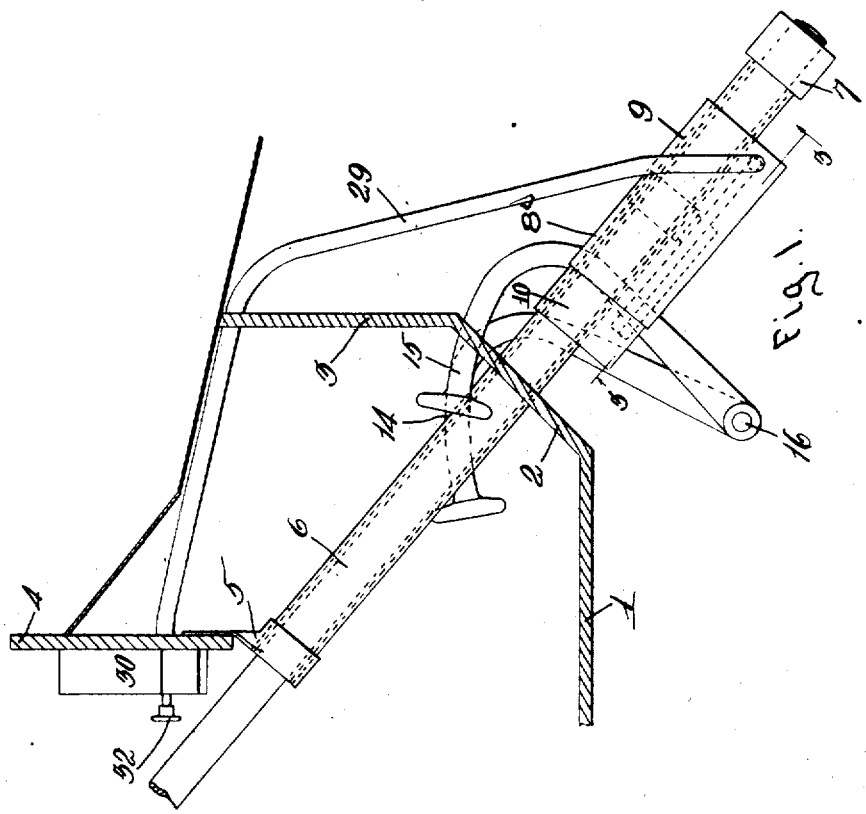
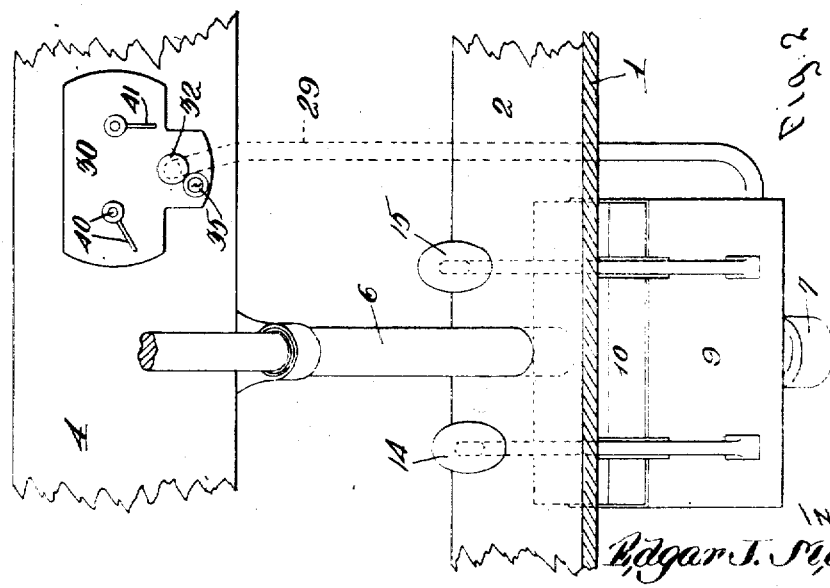

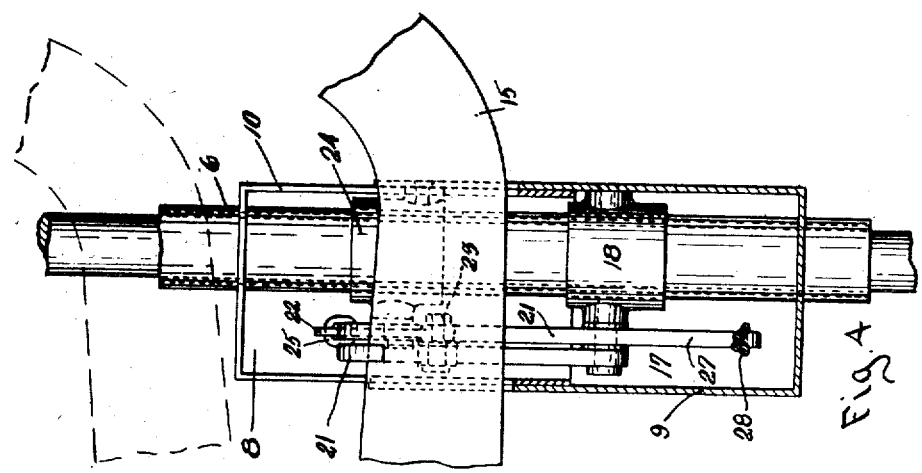
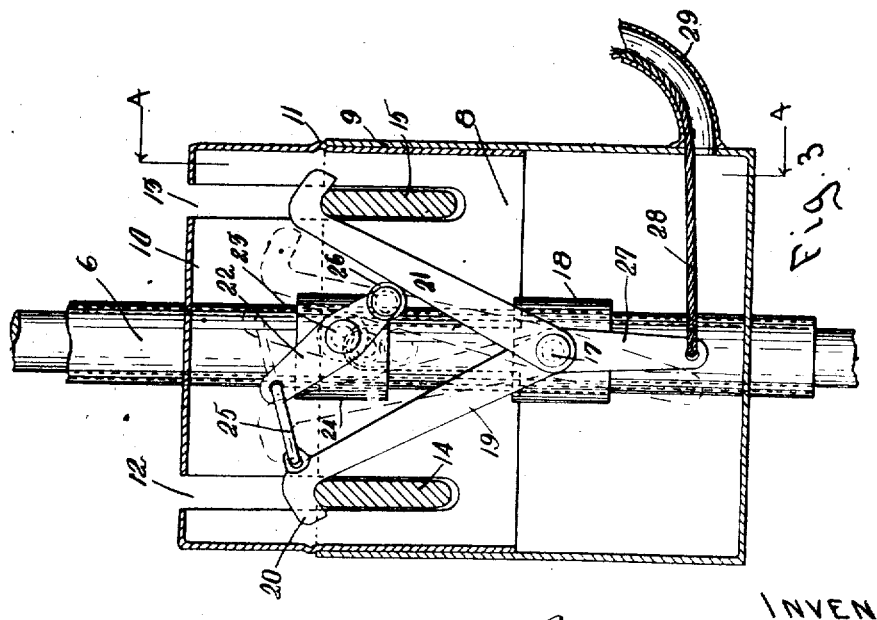

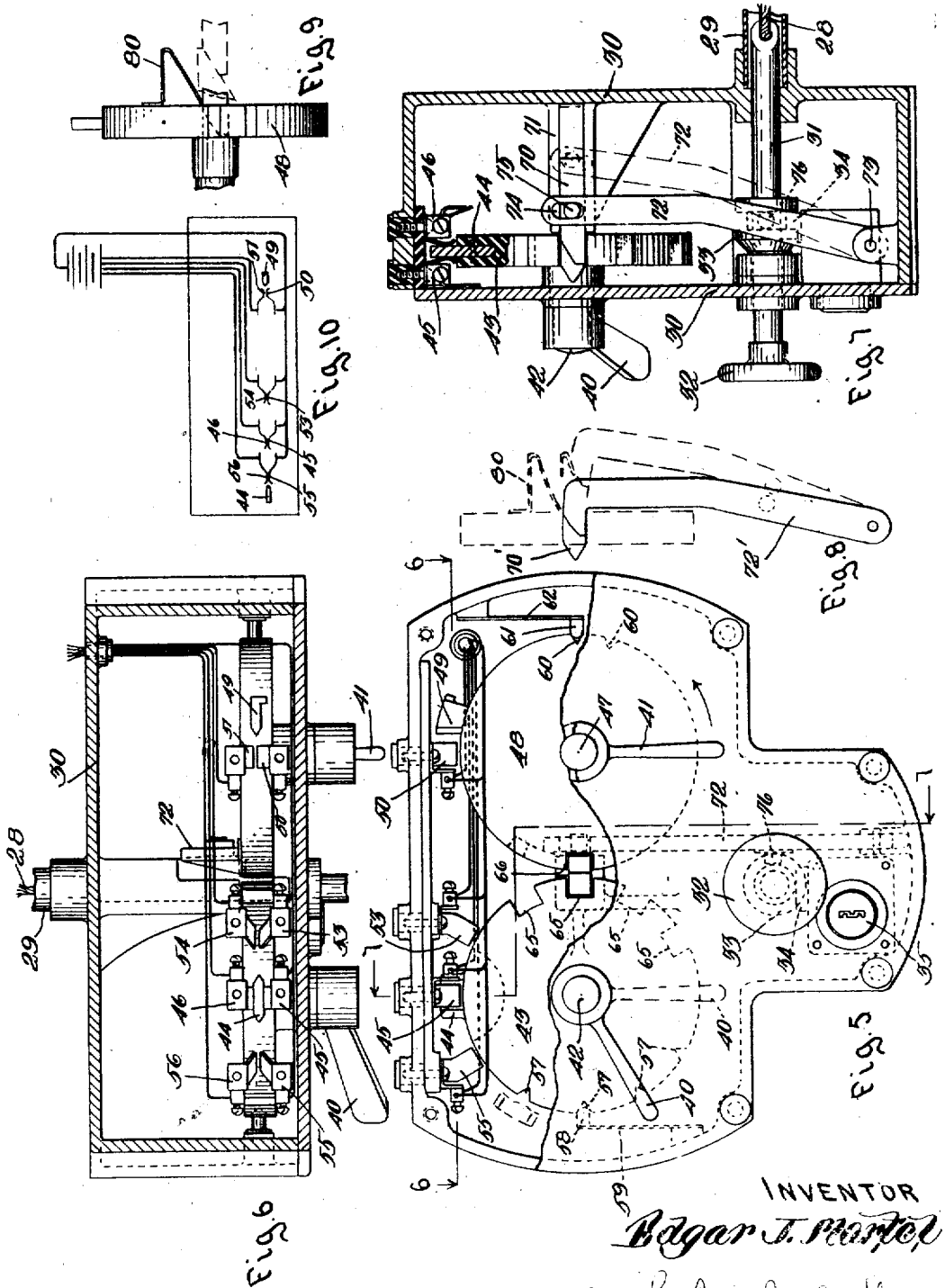

Patented Mar. 27, 1923.

1,449,769

UNITED STATES PATENT OFFICE.

EDGAR JOSEPH MARTEL, OF LACONIA, NEW HAMPSHIRE.

AUTOMOBILE LOCK.

Application filed July 1, 1921. Serial No. 481,769.

*To all whom it may concern:*

Be it known that I, EDGAR JOSEPH MARTEL, a citizen of the United States, residing at Laconia, in the county of Belknap and State of New Hampshire, have invented new and useful Improvements in Automobile Locks, of which the following is a specification.

This invention relates to automobile locks such as are designed to prevent unauthorized persons from taking possession and driving the car. For this purpose it provides mechanism for locking the ignition switch in off position, and the clutch, or brake pedals, or both, in unclutched and braked positions. In order to provide for various lighting requirements, the lighting system may be locked in any position desired so that tampering therewith is prevented. As it is always desirable that the ignition be in off position when the car is locked, this invention provides means by which should the ignition be on it is automatically thrown off when the car is locked. Further it provides a single handle or pull member by which the various locking actions are effected, this member being released by means of a key to unlock the parts simultaneously.

The switch-locking mechanism per se is not claimed in this case but is claimed in a divisional application filed November 11, 1922, Serial No. 600,320.

For a more complete understanding of this invention together with further objects and advantageous details and combinations of parts reference may be had to the accompanying drawings illustrating an embodiment thereof in which—

Figure 1 is a fragmentary longitudinal section through the floor and dashboard portions of a car showing the lock in position.

Figure 2 is a view of the same parts as seen from the driver's seat, the floor being shown in section.

Figure 3 is a section on line 3—3 of Figure 1.

Figure 4 is a section on line 4—4 of Figure 3.

Figure 5 is a front elevation partly broken away of the ignition and lighting switches and the lock and the casing for these parts.

Figure 6 is a section on line 6—6 of Figure 5.

Figure 7 is a section on line 7—7 of Figure 5.

Figure 8 is a detail of the locking bolt showing the ignition disk switch in dotted lines.

Figure 9 is a side view of the ignition switch showing the locking bolt in dotted lines.

Figure 10 is a diagram of the ignition and lighting circuits at the dashboard.

Referring now to Figures 1 to 4, at 1 is indicated a portion of the car flooring terminating at its forward end in an upwardly inclined portion 2, merging at its upper end in a vertical section 3. Positioned rearwardly of the section 3 and above the same is a dashboard portion 4 on which the various switches and locking mechanisms are mounted. At the lower edge of the dashboard 4 is mounted a bracket 5 which supports the upper and rear end of the usual steering post 6. This post extends downwardly through the inclined portion 2 of the floor and at its lower end carries connections, a portion of which is shown at 7, to the steering mechanism. Between the floor portion 2 and the connection 7 is positioned a housing 8. This housing is in the form of a substantially rectangular box or casing having a lower section 9 made fast to the steering post or to some fixed part of the car, and an upper section 10 telescopically related to the lower section and provided preferably with a rib 11 for engagement with the open end of the section 9. Both sections are provided with a pair of slots 12 and 13 within which the usual clutch and brake pedals 14 and 15, shown pivoted at 16 on a shaft, may move.

The housing sections are so proportioned that when either of the pedals 14 or 15 is depressed, for example, substantially as shown in Figure 3, these pedals engage within the slots to an extent sufficient to prevent the removal of the section 10 of the housing from the fixed section 9. When both pedals are in their upper position, however, it is possible to move the section 10 sufficiently to disengage it from the section 9 so that the mechanism within the housing may be accessible.

As shown more particularly in Figures 3 and 4 the steering post 6 has pivoted at 17 on a collar 18 fixed thereto, a lever 19. One end of this lever terminates in a hook 20 which may be brought down across the slot 12 above the pedal 14 to retain the same when depressed. Also pivoted at 17 to the collar 18 is a hook member 21 adapted to engage over the pedal 15 when this pedal is depressed to retain it in such position. The lever 19 and the hook 21 are connected for simultaneous operation by means of a lever 22 pivoted at 23 to a collar 24 also fixed to the steering post 6, this lever being connected at one end by a link 25 to the outer end of the lever 19 adjacent the hook 20 and the other end of lever 22 carrying a roller 26 riding on the inner edge of the hook 21. The lever 19 has an arm 27 by which it may be actuated, the end of this arm having made fast thereto the end of a cable 28. This cable 28 projects outwardly through a pipe 29 made fast at its lower end to the housing portion 9, this pipe projecting upwardly and rearwardly through the dashboard 4 and to a casing 30 mounted on the forward face thereof.

As shown more particularly in Figure 7 the upper end of the cable 28 is attached to a pull rod 31 which extends through the forward face of the casing 30 and terminates in a handle or pull member 32 within easy reach of the operator of the vehicle.

From this description it is evident that whenever one or both of the pedals 14 and 15 have been depressed to throw out the clutch or apply the brake, or both, on pulling the handle 32, these pedals may be retained in depressed condition, thus holding the clutch out of operation or the brake applied, or both. In order to retain the pull rod 31 in its outward position it may be provided with a collar 33 positioned within the casing 30 and engageable by a bolt 34 of a lock 35, this lock being accessible from the forward face of the casing to a key by which it may be unlocked when it is desired to permit the pedals to resume their normally raised positions.

The casing 30, as above noted, also contains the switch mechanism controlling the ignition for the engine and the lights for the car. Referring to Figures 2 and 5 to 9, the lighting switch-operating handle is indicated at 40 and the ignition switch handle at 41. The handle 40 is fixed to a shaft 42 extending within the casing and carries therein a disk 43 of insulating material. As shown more particularly in Figure 7 this disk carries a metallic contact 44 which may be brought in turn into bridging contact between pairs of spring terminals such as shown at 45 and 46. The handle 41 is similarly fixed to a shaft 47 carrying within the casing a disk of insulating material 48 which carries also a similar metallic contact element 49 which may make bridging contact between the terminals 50 and 51 of the ignition circuit.

A single pair of terminals only is required for the ignition circuit, but the lighting circuit requires a plurality of such pairs, in the present embodiment three being shown, one pair being indicated at 45 and 46 and similar pairs adjacent thereto being indicated at 53 and 54 and 55 and 56. For example, the terminals 53 and 54 when connected by the metallic bridge 44, may close the circuit for bright lights, while the contacts 45 and 46, when bridged, may close the circuit for dim lights, and the contacts 55 and 56, when bridged, may close the contact for curb light. For holding the switch yieldingly in any of its positions the outer edge of the disk 43 has a series of notches or depressions 57 therein for engagement by a spring finger 58 mounted at one end of a leaf spring 59 fixed at its other end to the wall of the casing. It will be noted that there are one more notches 57 than pairs of contacts for the various lighting circuits, the additional notch serving to hold the disk in position where no contacts are bridged, this being the off position of the switch when no lights are burning. The disk 48 is similarly provided with a pair of notches 60 with which cooperates a spring finger 61 carried at the end of a leaf spring 62 fixed to the casing, these notches determining on and off positions for the ignition. The disk 43 also has a series of rectangular notches 65 corresponding in number and relative positions to the notches 57, while the disk 48 has a similar notch at 66, there being one such notch only in this disk. These notches are so positioned that when the ignition circuit is in off position, in which case the contact 49 fails to bridge the contacts 50 and 51, the notch 66 will be substantially opposite to one of the notches 65 of the disk 43, the disks 43 and 48 being positioned in the same plane.

A locking bolt or plunger 70 is mounted in a guideway 71 fixed to the rear face of the casing 30 in position so that its forward end may be projected within the slots 65 and 66 so that when in projected position both disks 43 and 48 are locked against turning movement. This locking bolt is projected by means of a lever 72 pivoted at 73 to a portion of the casing and having a slot at its upper end at 74 engaging over a pin 75 fixed to the bolt 70. Near its lower end lever 72 carries on one face thereof a pin 76 riding in a groove in the locking collar 33. By this means when the handle 32 is pulled outwardly by the operator not only is the cable 28 pulled to lock the pedals, but also by acting on the lever 72 the locking bolt 70 is projected within the notches 65 and 66 so the ignition and lighting circuits are also locked.

While the lighting circuits may be locked in any position desired, whether entirely off or the curb light only lighted, the lights being dimmed or on full, it is always desirable to lock the car with the ignition off. For this reason one notch 66 only has been provided for the disk 48. To further insure that the ignition be off when locking is effected, provision is made by which should this switch not be in off position, it will be thrown to such position on the locking of the car. For this purpose the rear face of the disk 48 is provided with an outstanding cam portion 80, shown best in Figure 9, so positioned that if the disk 48 is turned to close the ignition switch the locking bolt 70 will impinge thereon and urge the disk 48 in a direction to open the ignition switch. This action is shown in Figure 8 in which a slight modification of the locking bolt is shown, it being formed integral with the upper end of the actuating lever, the lever being indicated at 72' and the bolt being indicated at 70'.

From this description it will be seen that this invention provides a locking mechanism by which it is insured that the ignition circuit is open when the car is locked, but wherein the lighting circuit may be locked in any position of adjustment desired so that it may not be tampered with. It is also evident that either one or both of the pedals may be locked in depressed position and that should either pedal be in raised position when the car is locked it can not thereafter be depressed while the car is locked, the hook projecting across its path and preventing such action. It is also evident that the pipe 29 effectually prevents access to the cable so that the pedals may not be released without the use of the key.

Having thus described an embodiment of this invention it should be evident to those skilled in the art that many changes and modifications might be made therein without departing from its spirit or scope as defined by the appended claims.

I claim:

1. In an automobile, clutch and brake pedals, an ignition switch, a lighting switch, and means for simultaneously locking said ignition switch in off position and said clutch and brake pedals and lighting switch in any of a plurality of positions.

2. In an automobile having a dashboard and clutch and brake pedals, the combination of a housing through which the pedals pass, a pair of hooks pivotally mounted in said housing in position to be swung outwardly of said pedals when they are depressed to lock them in depressed position, and means operable from the dashboard for projecting said hooks into locking position.

3. In an automobile having a steering post and clutch and brake pedals, the combination of a housing through which the pedals pass carried by said post, a pair of hooks pivoted to said post and positioned to be projected outwardly of said pedals when they are depressed to hold them in such position, a pull cable for projecting said hooks extending within reach of the vehicle driver, and means for holding them locked in position.

4. In an automobile having clutch and brake pedals, the combination of a two part casing, one of said parts being fixed and the other part engageable with said first part, said casing having slots for the reception of said pedals, and means for locking said pedals in depressed position, said pedals in said position preventing the disengagement of said casing parts.

5. In an automobile having clutch and brake pedals, the combination of a fixed casing having slots to receive said pedals, a lever pivoted within said casing and having a hooked end movable to engage above one pedal when it is depressed to hold it depressed, a hook pivoted to move into engagement above the other pedal when it is depressed to hold it depressed, connections between said hook and lever to insure simultaneous movement thereof into pedal-retaining position, and means to actuate said lever.

6. In an automobile having a steering post, clutch and brake pedals, a dashboard, and ignition and lighting switches carried by said dashboard, the combination of a casing carried by said steering post and through which the pedals pass, means within said casing for locking said pedals, a casing about said switches, locking means within said switch casing, and an actuating member for said pedal and switch-locking means projecting from said switch casing.

7. In an automobile having a steering post, clutch and brake pedals, a dashboard, and ignition and lighting switches carried by said dashboard, the combination of a casing carried by said post, and having slots through which said pedals pass, a pair of hooks pivoted to said post and movable to hold said pedals depressed, a cable having operative connection with said hooks to move them to holding position by pulling thereon, a casing for said switches, a plunger movable in said switch casing to lock and unlock said switches, a pipe connecting said casings and through which said cable passes, a pull member projecting from said switch casing and having operative connection to said cable and plunger, whereby on pulling said member said hooks and plunger are moved to locking positions, and a lock having operative engagement with said pull member to retain said member in pulled position and to release the same by the locking and unlocking respectively of said lock.

In testimony whereof I have affixed my signature.

EDGAR JOSEPH MARTEL.